United States Patent
Simons et al.

(10) Patent No.: US 9,350,330 B2
(45) Date of Patent: May 24, 2016

(54) PHYSICAL UNCLONABLE FUNCTION

(75) Inventors: Petrus Wijnandus Simons, Schaijk (NL); Erik Van Der Sluis, Eindhoven (NL)

(73) Assignee: INTRINSIC ID B.V., Eindhoven (NL)

( * ) Notice: Subject to any disclaimer, the term of this patent is extended or adjusted under 35 U.S.C. 154(b) by 347 days.

(21) Appl. No.: 13/988,919

(22) PCT Filed: Nov. 23, 2011

(86) PCT No.: PCT/EP2011/070831
§ 371 (c)(1),
(2), (4) Date: May 22, 2013

(87) PCT Pub. No.: WO2012/069545
PCT Pub. Date: May 31, 2012

(65) Prior Publication Data
US 2013/0234771 A1    Sep. 12, 2013

(30) Foreign Application Priority Data

Nov. 24, 2010   (EP) .................................... 10192352

(51) Int. Cl.
*H03K 3/37*       (2006.01)
*H03K 3/037*      (2006.01)
*G06F 7/58*       (2006.01)
*H04L 9/08*       (2006.01)

(52) U.S. Cl.
CPC ................ *H03K 3/037* (2013.01); *G06F 7/588* (2013.01); *H04L 9/0866* (2013.01)

(58) Field of Classification Search
None
See application file for complete search history.

(56) References Cited

U.S. PATENT DOCUMENTS

| | | | | |
|---|---|---|---|---|
| 7,840,803 B2* | 11/2010 | Clarke | .................... | G06F 21/31 257/E23.179 |
| 8,300,450 B2* | 10/2012 | Christensen | ....... | G11C 11/4091 365/102 |
| 8,516,269 B1* | 8/2013 | Hamlet | .................... | G06F 21/00 340/5.8 |
| 8,610,454 B2* | 12/2013 | Plusquellic | ........... | H04L 9/0861 326/8 |
| 8,699,714 B2* | 4/2014 | Tuyls | .................... | H04L 9/0866 380/278 |
| 8,719,666 B2* | 5/2014 | Marinet | .................. | G06F 21/73 714/769 |
| 8,848,477 B2* | 9/2014 | Schrijen | .................. | G06F 7/588 365/185.04 |
| 8,848,905 B1* | 9/2014 | Hamlet | .................... | H04K 1/04 380/35 |
| 2011/0215829 A1* | 9/2011 | Guajardo Merchan | . | G06F 7/588 326/8 |
| 2011/0307688 A1* | 12/2011 | Nurvitadhi et al. | ........... | 712/219 |

OTHER PUBLICATIONS

Chen et al., 2011, The Bistable Ring PUF: A New Architecture for Strong Physical Unclonable Functions, IEEE.*

(Continued)

*Primary Examiner* — Alexander H Taningco
*Assistant Examiner* — Nelson Correa
(74) *Attorney, Agent, or Firm* — Nixon & Vanderhye P.C.

(57) ABSTRACT

A physical unclonable function is provided 100, comprising a plurality of bus-keepers 110, each bus-keeper of the plurality of bus-keepers 110 being configured to settle into one of at least two different stable states upon power-up, the particular stable state into which a particular bus-keeper of the plurality of bus-keepers settles being dependent at least in part upon the at least partially random physical characteristics of the particular bus-keeper, and a reading circuit 120 for reading the plurality of stable states into which the plurality of bus-keepers settled after a power-up, the plurality of bus-keepers being read-only.

19 Claims, 8 Drawing Sheets

(56) References Cited

OTHER PUBLICATIONS

Maes et al., 2012. Experimental Evaluation of Physically Unclonable Functions in 65 nm CMOS. ESSCIRC. https://www.intrinsic-id.com/wp-content/uploads/2014/09/ESSCIRC.pdf.*
Kumar S S et al: "Extended abstract: The butterfly PUF protecting IP on every FPGA", Hardware-Oriented Security and Trust, 2008. Host 2008. IEEE International Workshop On, IEEE, Piscataway, NJ, USA, Jun. 9, 2008, pp. 67-70, XP031283313, ISBN: 978-1-4244-2401-6.*
International Search Report for PCT/EP2011/070831, mailed May 30, 2012.
Written Opinion of the International Searching Authority for PCT/EP2011/070831, mailed May 30, 2012.
Kumar, S.S. et al., "Extended Abstract: The Butterfly PUF Protecting IP on every EPFA", Hardware-Oriented Security and Trust 2008, (Jun. 9, 2008), pp. 67-70.
Holcomb, D.E. et al., "Power-up SRAM State as an Identifying Fingerprint and Source of True Random Numbers", IEEE Transactions on Computers, vol. 57, No. 11, (Nov. 1, 2008), pp. 1-14.
Guajardo, J. et al., "Physical Unclonable Functions and Public-Key Crypto for FPGA IP Protection", Field Programmable Logic and Applications, 2007, (Aug. 1, 2007), pp. 189-195.

* cited by examiner

PHYSICAL UNCLONABLE FUNCTION

This application is the U.S. national phase of International Application No. PCT/EP2011/070831, filed 23 Nov. 2011, which designated the U.S. and claims priority to EP Application No. 10192352.2, filed 24 Nov. 2010, the entire contents of each of which are hereby incorporated by reference.

BACKGROUND OF THE INVENTION

Physical unclonable functions (PUFs) have proven to be advantageous alternatives for many forms of secure identification, including the storing of keys, identifiers and the like in secure memories.

A physical unclonable function exploits manufacturing variations to derive a digital identifier. The digital identifier is thus tied to a physical medium. Because the physical unclonable function depends on random process variation, it is easy to create a PUF but it is very hard, if not downright impossible, to create a PUF which would give rise to a particular pre-determined identifier. The manufacturing variations lead to different physical characteristics of the memory element. For example, the physical characteristics may include: doping concentrations, oxide thickness, channel lengths, structural width (e.g. of a metal layer), parasitic (e.g. resistance, capacitance). When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

This property of PUFs makes them suitable for a range of applications. For example, PUFs may be used to combat counterfeiting. Although, it may be possible to fraudulently copy a particular device or other manufactured item, it would not be possible to duplicate a PUF which could be embedded therein with sufficient precision so that it would give rise to the same digital identifier as the original. As a further example, PUFs are used to create cryptographic keys. Using a PUF the need for secure memory to store a key is circumvented. A PUF furthermore provides natural protection against illegal attempts to obtain the cryptographic key through reverse engineering, since damage which could be inflicted to the PUF during the attempt would change the digital identifier. Preferably, the digital identifier is unique for the electronic device wherein the physical unclonable function is embedded.

PUFs have been advantageously applied in electronic devices. Even tiny manufacturing variations which are unavoidable during manufacture of an IC lead to different properties of the IC. These different properties are normally suppressed, in an effort to obtain a batch of ICs that operate in the same manner. However, to create a PUF the differences among individual ICs in a batch of ICs are exploited.

For example, it has been observed that the startup behavior of some memory elements, demonstrate PUF like behavior. When such memory is powered-up, it tends to contain content, i.e., comprise a sequence of data values, which depends on the at least partially random physical characteristics of the components, e.g., gates or transistors, which make up the memory, e.g., their physical arrangement relative to each other. If the memory is powered-up multiple times, it would contain, up to a large percentage, the same content. Unfortunately, since the PUF behavior depends on small fluctuations, a certain error percentage is unavoidable. An error correction procedure, using so-called helper data, can be used to correct for these fluctuations, and make sure an identical digital identifier is derived, each time the PUF is used.

It is thus desirable that the content of a memory, when compared after multiple power-down and power-up sequences is identical to a large extend. At the same time it is desirable, that when content of the memory is compared to other memories of the same type it is for a large percentage different.

SUMMARY OF THE INVENTION

A physical unclonable function is provided, comprising a plurality of bus-keepers, each bus-keeper of the plurality of bus-keepers being configured to settle into one of at least two different stable states upon power-up, the particular stable state into which a particular bus-keeper of the plurality of bus-keepers settles being dependent at least in part upon the at least partially random physical characteristics of the particular bus-keeper, and a reading circuit for reading the plurality of stable states into which the plurality of bus-keepers settled after a power-up, the plurality of bus-keepers being read-only.

By having the bus-keeper read-only, i.e., only a value can read from them, not a new value, written write logic may be omitted. This makes the number of gates smaller, and the design cheaper. An important advantage is that a power domain may be used.

In an embodiment, the reading circuit comprises a plurality of multiplexers for selecting bus-keepers from the plurality of bus-keepers.

Using multiplexers for selecting bus-keepers from the plurality of bus-keepers has the advantage that no address decoder is needed to select bus-keepers. This has the advantage that the plurality of bus-keepers is smaller in size on an integrated circuit and in power requirements than a comparable memory would be.

A multiplexer or MUX is an electronic component that performs multiplexing; it selects one of a plurality of digital input signals and forwards the selected input into a single line. A multiplexer of n inputs may have log_2 (n) select lines, which are used to select which input line to send to the output. In an embodiment of the invention multiplexers are used having two inputs and one select line.

In an embodiment, the physical unclonable function comprises a power supply and a power domain, the plurality of bus-keepers being comprised in the power domain and at least a part of the physical unclonable function being outside the power domain, the power domain being configured for selectively connecting and disconnecting the plurality of bus-keepers from the power supply while at least a part of the physical unclonable function is connected to the power supply.

Even though the power requirements of a bus-keeper is very small, there are still several advantages connected to having a power domain.

Because the bus-keepers are selected using multiplexers the reading circuit can be separated from the bus-keepers. This allows the power domain to be smaller. As a result a small switch for the power domain can be used.

Because of the power domain the plurality of bus-keepers need only be powered during read out of the bus-keepers. It has been found that this reduces the problematic aging effect that may occur in PUFs based on CMOS logic.

Furthermore, having a power domain allows the reading circuit to read the bus keepers more than once by performing multiple power-up, read, power-down cycles of the plurality of bus-keepers. In an embodiment the reading circuit is configured for multiple power-up, read, power-down cycles of the plurality of bus-keepers. By processing the multiply read plurality of stable states noise may be reduced. For example, the multiply read plurality of stable states may be averaged and rounded.

For example, after each reading of the plurality of bus-keepers, the plurality of stable states may be converted to an array of bit-values. By reading multiple times multiple arrays of bit-values are obtained. The multiple arrays are summed, by adding corresponding components together, to obtain a summed array. Each component of the summed array is divided by the number of readings. Finally, each components is rounded to 0 or 1. If a value of 0.5 is obtained it may be rounded to 1, or it may be replaced by a randomly chose 0 or 1. The averaged array has reduced noise, and may be used to derive an identifier. The averaged array is less suitable for deriving a random number.

For example, the at least a part of the physical unclonable function being outside the power domain may comprise the reading circuit or part thereof, or the PUF control logic, etc.

In an embodiment, the plurality of bus-keepers, the power domain, the power switch, and the at least a part of the physical unclonable function are implemented on a single integrated circuit.

Having the power switch on-chip is possible because the power switch may be smaller due to the small power requirements of the bus-keepers.

The physical unclonable function may be provided in an electronic device, in particular a mobile electronic device such as a mobile phone, set-top box, computer, a smart card, an RFID tag.

The physical unclonable function may be used to derive an identifier. The identifier may be used as a cryptographic key, or as a seed to derive a cryptographic key In an embodiment, at least one bus-keeper in the plurality of bus-keepers 110 is not configured with means for selectively writing a value in the bus-keeper. Preferably, none of the bus-keepers in the plurality of bus-keepers are provided with means for selectively writing a value in the bus-keeper.

In an embodiment, the physical unclonable function comprises PUF control logic for deriving an identifier from the plurality of stable states.

In an embodiment, the PUF control logic is configured for applying an error correcting algorithm to the plurality of stable states and to helper data for deriving the identifier.

Many methods exist to apply an error correcting code to PUF data. For example, during an enrollment phase, an array of values representing the plurality of stable states may xor-ed with a code word of an error correcting code. The result, the xor difference, may be stored in a memory. During a use phase, a new reading of the plurality of stable states is obtained, an array of values representing the new plurality of stable states is xor-ed with the stored xor difference. The result is subjected to an error correcting algorithm associated with the error correcting code. The result is the original code word. If desired the original code word may be xor-ed with the stored xor-difference to obtain the enrollment response.

In an embodiment, the PUF control logic is configured for deriving a random number from the plurality of stable states.

The random number may be obtained by applying a hash function, e.g., sha-256, to the plurality of stable states, or to an array of values representing the plurality of stable states.

The random number may be used as a seed in a pseudo random number generator. In an embodiment the plurality of stable values is used in two ways: The plurality of stable values is used to derive an identifier to obtain an identifier. For this purpose noise in the bus-keepers is undesirable; The same plurality of stable values may be used without error correcting to obtain an random number, here noise is desirable.

Deriving a random number from the plurality of stable states is particularly advantageous if the PUF has a switchable power domain. The switchable power domain allows the plurality of bus-keepers to be started again, e.g., power-down and powered-up, without interrupting power to the PUF control logic. In this way, multiple random number may be derived, of high quality. That is a sequence of true random number may be derived without the need to use a pseudo random number generator. True random numbers are especially useful when used in a cryptographic protocol, since the give a higher security. For example, when used in a challenge-response protocol. The challenge or plurality of challenges may comprise respectively a random number generated from PUF data or a plurality random number generated from PUF data.

In an embodiment, the PUF control logic is configured for a read-cycle comprising: powering down the plurality of bus-keepers, powering up the plurality of bus-keepers, and reading the plurality of bus-keepers.

Powering down and powering up uses the power switch. The read-cycle may be performed once. However, the read-cycle may also be performed multiple times, say 2 times, 3 times, or more.

In an embodiment, at least one bus-keeper comprises exactly one data connection, and wherein the exactly one data connection is only configured for reading the stable-state into which the at least one bus-keeper settled upon power-up.

Preferably, all bus-keepers of the plurality of bus-keepers comprise exactly one data connection, and wherein the exactly one data connection is only configured for reading the stable-state into which the at least one bus-keeper settled upon power-up.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc.

In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

LIST OF REFERENCE NUMERALS 100 a PUF system
110 a plurality of bus-keepers
112, 114, a bus-keeper
116, 118
120 a reading circuit
130 a PUF control logic
140 a non-volatile memory
150 a circuit using the processed PUF data
160 a comparator
165 a non-volatile memory
300 a bus-keeper
310 a first inverter
320 a second inverter
330 an output
340 a resistor
350 a bus-keeper
400 a PUF reading system
410 a switchable power-domain
420 an isolation circuit
430 a read-out circuit
500 a PUF reading system
510, 520, a MUX
530
612, 614, an AND gate
616, 618
700 a PUF reading system
710, 720 an AND gate
812, 814, a flip-flop
816, 818
822, 824, a MUX
826

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Bus-Keepers

The inventors had the insight that a cross-coupled loop of two inverters may be used as a source of PUF data. A cross-coupled loop of two inverters is also known in the art as a bus-keeper.

Figure 3A:
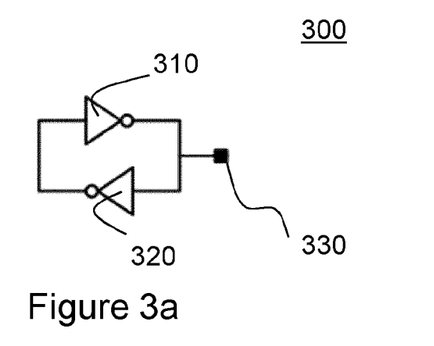
FIG. 3a is a block diagram illustrating a first type of bus-keeper.

FIG. 3a shows a first type of bus-keeper 300, which may be used in the invention.

FIG. 3a shows a cross-coupled loop of a first inverter 310 and a second inverter 320. An output of first inverter 310 is connected to an input of second inverter 320, and an input of first inverter 310 is connected to an output of second inverter 320. The bus-keeper has a single data-connection from which the contents of the bus-keeper may be read: output 330.

Figure 3B:
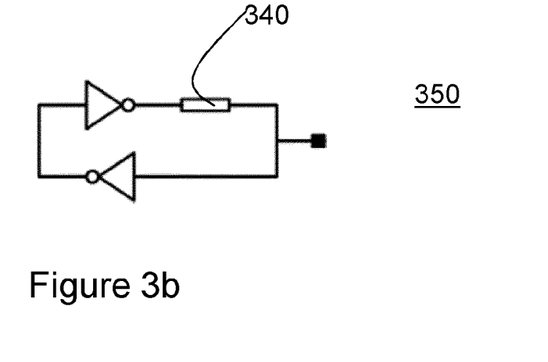
FIG. 3b is a block diagram illustrating a second type of bus-keeper.

FIG. 3b shows a second type of bus-keeper 350. FIG. 3b is the same as FIG. 3a except for the addition of a resistor between the output of inverter 310 and the input of inverter 320.

Conventionally, a bus-keeper (also known as a bus-holder) is a weak latch circuit, used to hold the last value on a tri-state bus. The circuit is then basically used as a delay element with the output connected back to the input through a relatively high impedance. This is usually achieved with two inverters connected back to back. Bus-holders are used to prevent CMOS gate inputs from getting floating values when they are connected to tri-stated nets. Otherwise both P and N transistors in the gate could get turned on, thus shorting the power supply and ground, which would destroy the CMOS gate or cause high leakage current. This is prevented by the bus-holder pulling the input to the last valid logic level (0 or 1) on the net. The circuit is usually placed in parallel with the tri-stated net.

Optionally, a bus-keeper comprises a resistor, the resistor driving the bus weakly; therefore other circuits can override the value of the bus when they are not in tri-state mode. The resistor may be dispensed with, although some bus-keeper designs may include one e.g. to reduce peak flows.

If the resistor, e.g., resistor 340, in the design is of in the order of a few kilo-ohm, the bus-keeper may show a bias for a particular start-up value; One inverter being weaker than the other due to the resistor. Even a few ohms may give rise to measurable bias but its influence will be much less. A bus-keeper may also comprise one inverter which drives weaker than the other one; this option does not need a resistor. Having one weak inverter may also give some bias, but will also work well.

A bus-keeper without a resistor can be made using standard cell inverters. For PUF it has the same advantages without the risk that the series resistor causes biasing.

Ideally, a bus-keeper used in a PUF will have a start-up value which is 1 or 0 with 50% chance given its design, but which will repeat its particular start-up value each time it is powered up. If the bus-keeper have a higher or lower probability of 50% of being 1 or 0, they have a bias either for 0 or for 1.

It is preferred that both inverters are designed to be of equal strength in driving the output. This gives the best chances of obtaining a bus-keeper with low bias, and thus high entropy. However, it is noted that a bus-keeper having a designed in bias, e.g., having a low bias due to a weaker inverter or a small resistor, or having a large bias due to a larger resistor is also useful as PUF data. However if the bias is high, i.e., entropy is low, then entropy improving measures are preferably used.

The particular bias of the bus-keeper for a start-up state depends on the design of the bus-keeper and how it was made. The start-up value of a bus-keeper is susceptible to noise and perturbations.

It is advantageous to be able to use bus-keepers even though they may have a slight bias or even a strong bias, since this allows one to create the PUF system from standard components, i.e., using bus-keepers from a standard cell library.

Figure 9:
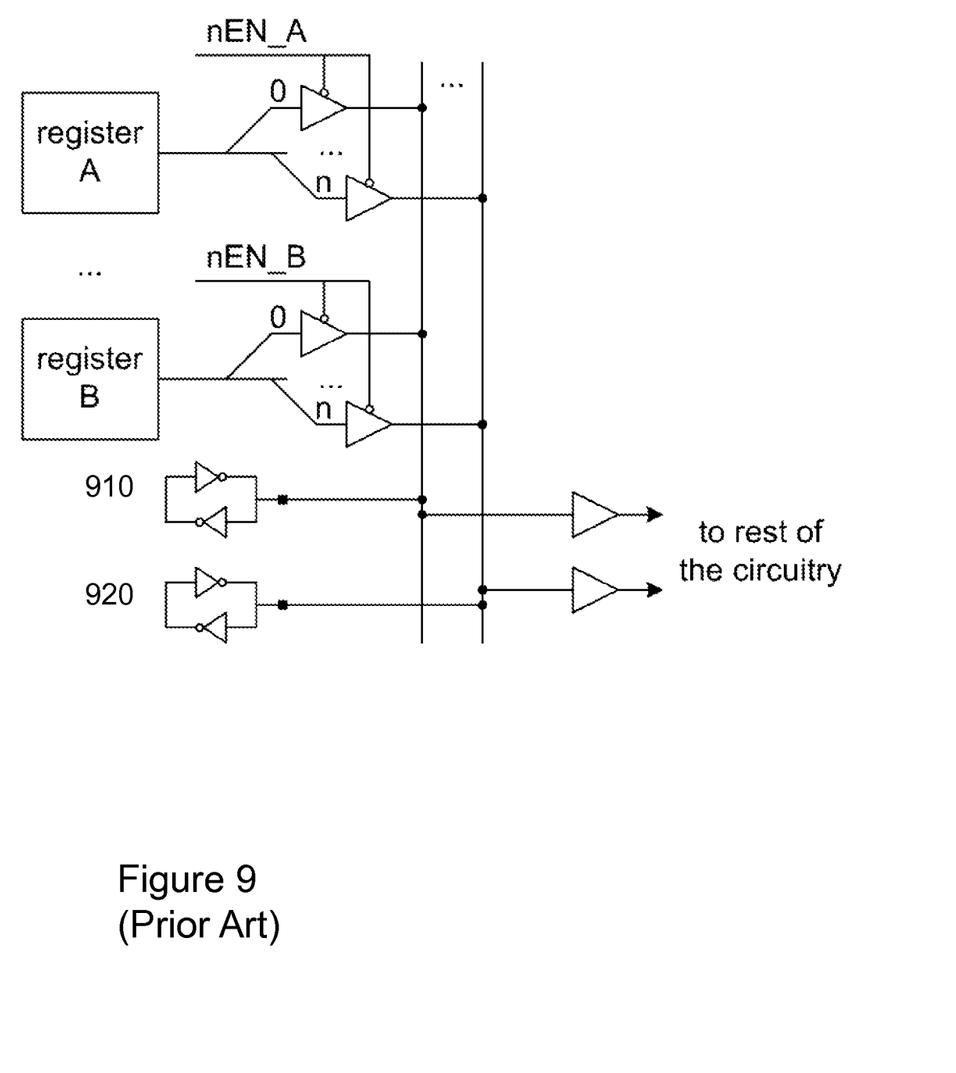
FIG. 9 is a prior art figure illustrating conventional use of a bus-keeper.

FIG. 9 shows a conventional use of a bus-keeper. FIG. 9 shows two registers: register A and B, each being n+1 bits wide. The registers are both connected to a parallel bus, which is n+1 bits wide. Each bit of a register is connected to an associated line of the parallel bus through a tristate buffer. FIG. 9 shows how 2 bits of each register are connected to two corresponding lines of the bus, through buffer elements. Each line of the bus is connected to a bus-keeper. FIG. 9 shows two bus-keepers 910 and 920 each connected to a line of the bus. The effect of the bus-keepers is that they avoid the bus from floating. The last value put on the bus is kept by the bus-keeper.

Instead of registers other functional blocks can be the source of data (e.g. ALUs, CPU cores, etc.). In this example the enable signal for the bus driver is active low (nEN_A), these could be active high.

It is known that an SRAM cell also comprises a cross-coupled loop of two inverters. However, an SRAM cell also comprises two additional access transistors that serve to control the access to a storage cell during respectively read and write operations. These access transistors are not needed in a bus-keeper when used in the invention. Especially, control for write operations is entirely dispensed with. SRAM has multiple data bits each connected via their own read transistor on one wire; this is similar to FIG. 9, wherein the tristate buffers are replaced by a read transistor, and wherein the buskeeper is removed.

The bus-keeper is configured to settle into one of at least two different stable states upon power-up, the particular stable state into which the bus-keeper settles being dependent at least in part upon the at least partially random physical characteristics of the bus-keeper. The start-up value of a bus-keeper is used as PUF data.

One advantage of using bus-keepers is that they draw little current. When the bus-keepers would be placed in a separate switchable power domain the power switch for this domain can be smaller than would be needed for e.g. a memory or flip-flop based PUF. This opens the possibility to implement the power switch on-chip, while the extra cost in area is limited. When a memory is used the power consumption is significantly higher during readout, since all memory decoding logic would be included in the power domain too. Flip-flops have more logic by themselves and therefore also consume more power; this would require larger switches to keep supply voltage within operating range. The switch does have an internal resistance, so more current means more voltage drop; to compensate for this the resistance must be decreased which can be done by increasing the size of the switch.

FIG. 1

Figure 1:
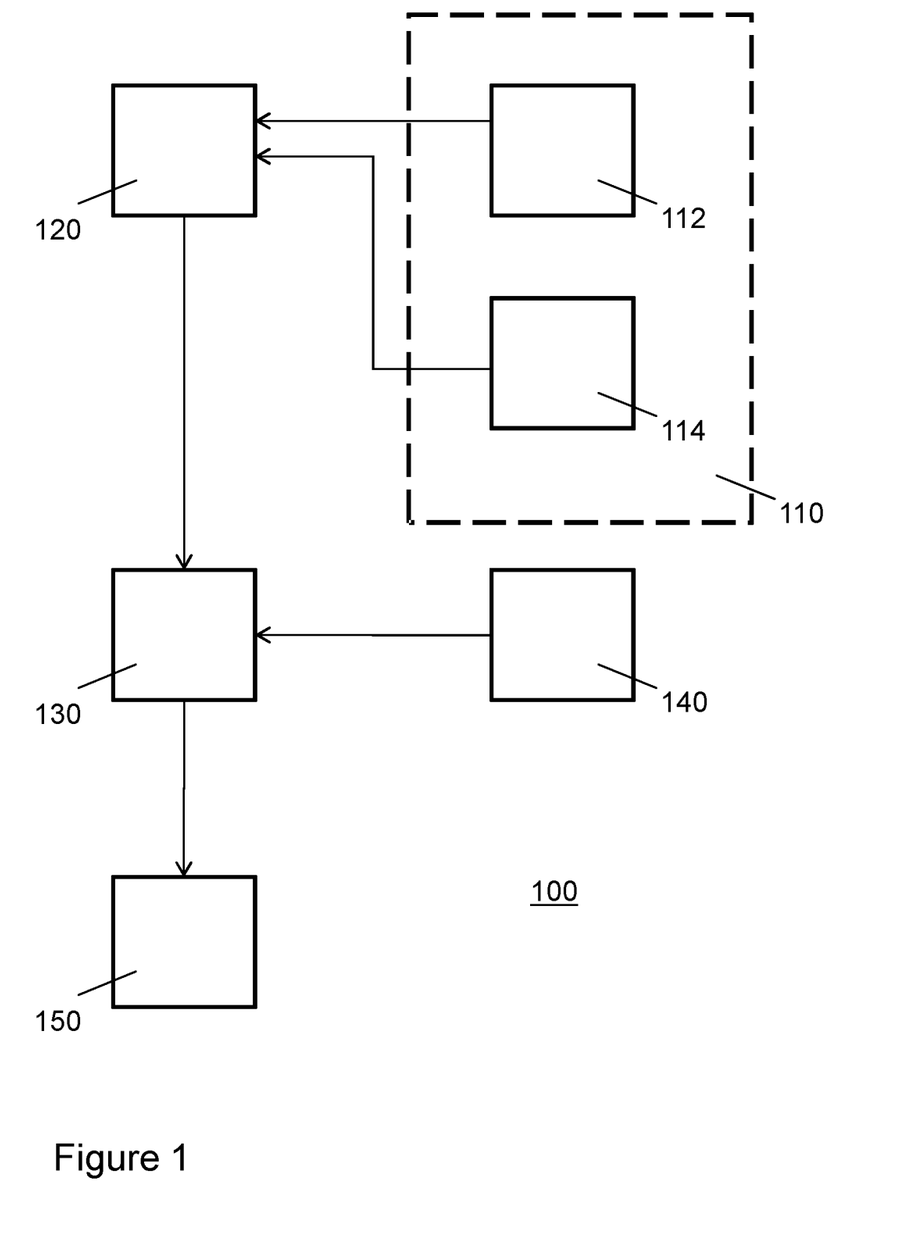
FIG. 1 is a block diagram illustrating an embodiment of a PUF system.

FIG. 1 illustrates in a schematic fashion an exemplary PUF system 100.

PUF system 100 comprises a plurality of bus-keepers 110. The plurality of bus-keepers may be arranged in a suitable fashion upon an integrated circuit, e.g., arranged as an array.

FIG. 1 shows two bus-keepers in plurality of bus-keepers 110: a first bus-keeper 112 and a second bus-keeper 114. However this is only an example, normally the number of bus-keepers used will be considerably higher. For example, the number of bus-keepers may be 1024 or 4096. The number of bus-keepers may be lower than 1024. The number of bus-keepers may be higher than 1024. The number of bus-keepers to use depends on a number of factors, including the following: The desired number of bits in an identifier depending upon the plurality of bus-keepers 110; the higher the desired number of bits the more bus-keepers are needed. The error-rate of a bus-keeper in the chosen technology, i.e., how likely is a bus-keeper to change its particular start-up value, i.e., start-up bit, at a subsequent start-up; the higher the error-rate the more error-correction is needed and the more bus-keepers are needed.

The entropy in the bus-keepers, i.e., how likely is the start-up value of a bus-keeper different from the start-up value of a different bus-keeper; the lower the entropy the more bus-keepers are needed.

A bus-keeper has only one data connection. The data connection is used in the invention to read the start-up value. Apart from the data-connection the bus-keeper will be connected to a power supply, using a Vss and Vdd connection. One type of bus-keeper which may be used for the invention has precisely three external connections: one data connection and two power connections (Vss and Vdd).

PUF system 100 further comprises a reading circuit 120 for reading the contents of plurality of bus-keepers 110. The content of each one of the bus-keepers in plurality of bus-keepers 110 is determined solely by their start-up behavior. PUF system 100 and in particular neither reading circuit 120 nor plurality of bus-keepers 110 nor any bus-keeper thereof have write capability which would allow one to write selected data to a bus-keeper in plurality of bus-keepers 110. Omitting write-logic makes the cells in plurality of bus-keepers 110 smaller. The plurality of bus-keepers cannot be used as write-able memory without the addition of extra logic, but this is not needed for a PUF, in fact it may be regarded as a security advantage; writing a pre-determined string in memory with the objective to fool subsequent logic is impossible.

As a consequence one cannot write anti-aging data to a bus-keeper, however the use of a power domain comprising the plurality of bus-keepers mitigates this problem.

Reading circuit 120 preferably comprises a plurality of MUXes, the plurality of MUXes being arranged to receive a plurality of selection signals for selecting a particular one of the plurality of bus-keepers.

PUF system 100 comprises a PUF control logic 130. PUF control logic 130 may be implemented in hardware on the integrated circuit. PUF control logic 130 may comprise a data processor, e.g. a CPU, for executing a software program to obtain the functionality of PUF control logic 130.

PUF system 100 further comprises a memory 140. Memory 140 is non-volatile, writable memory such as a flash memory, EPROM memory, EEPROM etc. Memory 140 stores helper data obtained earlier for this particular instantiation of plurality of bus-keepers 110.

PUF control logic 130 is configured to receive the PUF data read by reading circuit 120 from plurality of bus-keepers 110 and to receive helper data from memory 140. Using a helper Data algorithm, also known as a Fuzzy Extractor, e.g. executed on PUF control logic 130 the PUF data obtained e.g. from plurality of bus-keepers 110 is processed using the helper data. As a result of this processing the variation which may be present in the PUF data, is removed.

One way to use a PUF to create a cryptographic key is as follows. First, during an enrollment phase, the start-up values of plurality of bus-keepers 110 is read, for example using reading circuit 120. Then, using the fuzzy extractor, also known as a shielding function, helper data is created, see e.g. WO/2004/066296. On the device, the helper data is stored in memory 140. During a use phase, a new response is obtained by evaluating the PUF again. The new response may differ from the response obtained during the enrollment phase. Preferably, the new response differs little from the response, so that little error-correction is needed. It is required that the new response agrees with the response at least for a percentage of the start-up values, the value depending on e.g. the error correction. The percentage is more than 50%.

By combining the new response with the stored helper data, according to a helper data algorithm, a corrected response is obtained. The helper data ensures that the corrected response is the same, each time it is derived.

Memory 140 is not required; the helper data may be stored off-line, PUF control logic 130 receiving the helper data from a source external to PUF control logic 130 when needed.

After correction of the perturbation in the response, the response may be used for various purposes. As an example, PUF system 100 comprises a cryptographic circuit 150 for using the response for cryptographic purposes.

An example application of the corrected response includes applying a key derivation algorithm (KDF) to the corrected response to obtain a cryptographic key. Examples of such key derivation functions include KDF1, defined in IEEE Std 1363-2000, and similar functions in ANSI X9.42.

An example application of the corrected response includes using the corrected response or key in an authentication algorithm.

Figure 2:
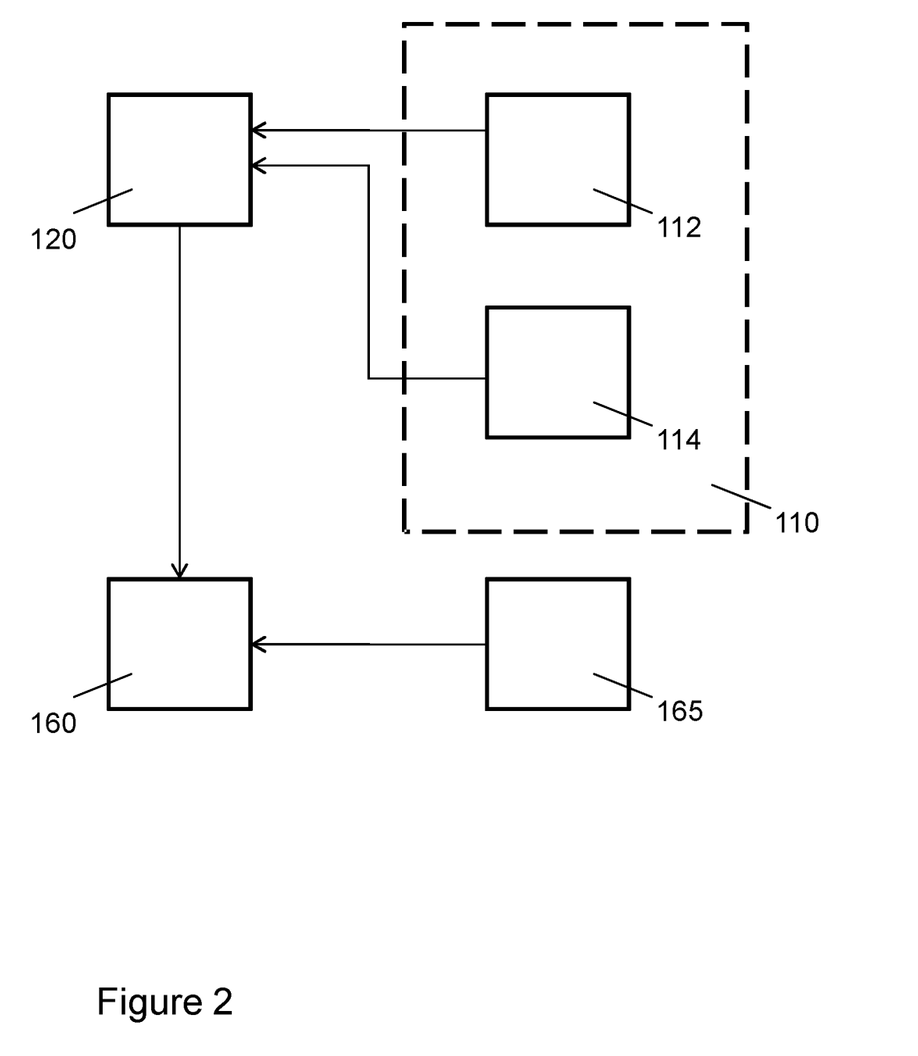
FIG. 2 is a block diagram illustrating an optional variation in the PUF system of FIG. 1.

The invention may also be used without error correction, i.e., without PUF control logic 130, memory 140 and circuit 150. An example is shown in FIG. 2. FIG. 2 is the same as FIG. 1 but without PUF control logic 130, memory 140 and circuit 150. A response obtained during enrollment is stored in non-volatile memory 165. During use, comparator 160 receives a response from reading circuit 120 and compares it with the stored response stored in memory 165. If the number of differences between the two responses (i.e., represented as strings of bit values) is less than a predetermined limit, the PUF is regarded as authentic.

Instead of the corrected response the error correction process may produce other identifiers which depend on the variation in physical characteristics but which are correct for being identical upon each start-up. In particular, a corrected code word may be established. The embodiments given herein may use a variant with the same effect.

During use PUF system 100 may operate as follows.

First the device comprising plurality of bus-keepers 110 is powered-on. As a result each one of the plurality of bus-keepers 110 settles in a stable state. A bus-keeper is a bi-stable element. The bus keeper will remain in one of two states. The stable states in which a bus-keeper is started after power-up is determined by variations in physical characteristics caused during manufacturer of the plurality of bus-keepers 110.

Next, the plurality of bus-keepers 110 is read out by reading circuit 120. The start-up value of a bus-keeper may be represented with logic 0 or a logic 1. The plurality of bus-keepers 110 thus gives rise to a plurality of start-up values. Reading circuit 120 may represent the plurality of start-up values as an array of bits, each different bit in the array corresponding to a different one of the plurality of bus-keepers 110. The plurality of start-up values is called the response of plurality of bus-keepers 110.

The plurality of start-up values is processed by circuit 150. In one embodiment, PUF control logic 130 executes an error-correcting algorithm. Thus a corrected response is obtained.

Due to bias in bus-keeper for one of its two possible stable start-up states there may be a bias in the response. For example, the majority of values may be logic 1. The amount of entropy per bit can be increased by hashing the corrected response to a shorter response, applying a hash function to the corrected response. For example, by applying the sha-256 algorithm to a corrected response which is larger than 256 bit, a 256 bit sequence is obtained of the same entropy, and thus a higher entropy per bit.

By increasing the entropy the dependence on the variations in physical characteristics caused during manufacturer of plurality of bus-keepers 110 is increased by reducing dependence on the bias of individual bus-keepers.

Having a MUX-tree allows one to have fewer components in the power domain. As a result the power domain is smaller and will draw a smaller current. In particular, peak current when switching the power domain on will be lower. A switch for switching on and off the power domain comprising plurality of bus-keepers 110 can therefore be smaller. A smaller switch is an advantage. In particular a smaller switch can be implemented on an integrated circuit.

In an embodiment, plurality of bus-keepers 110 and reading circuit 120 are integrated in one integrated circuit. In an embodiment, plurality of bus-keepers 110, reading circuit 120 and PUF control logic 130 are integrated in one integrated circuit. In an embodiment, plurality of bus-keepers 110, reading circuit 120, PUF control logic 130, and memory 140 are integrated in one integrated circuit. In an embodiment, plurality of bus-keepers 110, reading circuit 120, PUF control logic 130, memory 140 and circuit 150 are integrated in one integrated circuit.

Figure 4:
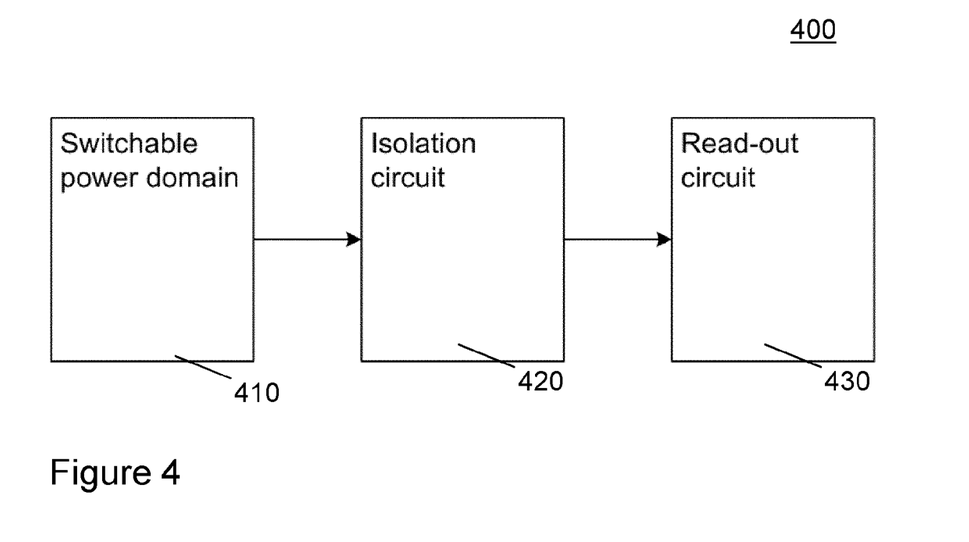
FIG. 4 is a block diagram illustrating an embodiment of a PUF system.

FIG. 4 illustrates a refinement of the reading mechanism of the plurality of bus-keepers 110, which may be applied in a system such as PUF system 100.

FIG. 4 shows a switchable power-domain 410. Power-domain 410 comprises plurality of bus-keepers 110. Components in power-domain 410 may be disconnected from the power supply, independent from other components of the integrated circuit in which power-domain 410 is comprised, such as reading circuit 120 or PUF control logic 130. FIG. 4 further comprises an isolation circuit 420. The isolation circuit avoids that power-domain 410 is connected to CMOS components while the power domain is switched off. Isolation circuit 420 avoids floating nets within the circuit. FIG. 4 further comprises a read-out circuit, such as reading circuit 120, to read out plurality of bus-keepers 110 in power-domain 410.

During operation power-domain 410 is switched on. Isolation circuit 420 then allows access to power-domain 410 by read-out circuit 430. Read-out circuit 430 then reads the contents of plurality of bus-keepers 110. The response of plurality of bus-keepers 110, i.e., the plurality of start-up values, may be forwarded to PUF control logic 130 or comparator 160 for use, or may be exported from the integrated circuit, etc.

After the contents of plurality of bus-keepers 110 is read, power-domain 410 is switched off. For example, PUF control logic 130 or reading circuit 120 may give the command to switch power-domain 410 off. After power-domain 410 has been switched off, isolation circuit 420 reroutes access to power-domain 410 away. For example, isolation circuit 420 gives a fixed predetermined response to read attempts, e.g., logic 0.

Different implementations of the isolation circuit are possible; for example isolation circuit 420 may be configured to keep the outputs at the last signal value and/or include a level shifting function. A level shifting function may be used in case different power domains use different supply voltages.

Power-domain 410 gives several advantages.

If the PUF data obtained from plurality of bus-keepers 110 has been used, the data may be deleted from a working memory, e.g., from logic 130. For example, a key is derived, which is used for a cryptographic purpose, e.g., encrypting or decrypting a message, authentication etc. That key may be deleted when done. When the key is needed again, power-domain 410 may be restarted and the key can be derived anew. Powering down of the integrated circuit in which power-domain 410 is comprised is not needed. Thus security is increased since the time sensitive material, e.g. a key, is present in a working memory is decreased.

A PUF based on CMOS is subject to a condition known as aging. As the PUF becomes older, the quality of its responses degrades; the number of differences between an original response obtained during enrollment and a new response obtained after powering-up plurality of bus-keepers 110 during a use-phase increases. At some point the helper data may need to correct too many errors. At that point the enrollment response cannot be recovered.

The inventors had the insight that the aging is worsened by keeping the bus-keepers powered. By introducing power-domain 410 the time plurality of bus-keepers 110 is powered may be reduced, and the aging is reduced. Previously it was believed that aging was primarily caused by the number of power-up power-down sequences a CMOS element was subjected to.

Although an isolation circuit, for isolating plurality of bus-keepers 110 when it is cut off from the power supply is greatly preferred to avoid floating gates, it is not strictly required, for example if floating can be tolerated.

Figure 5:
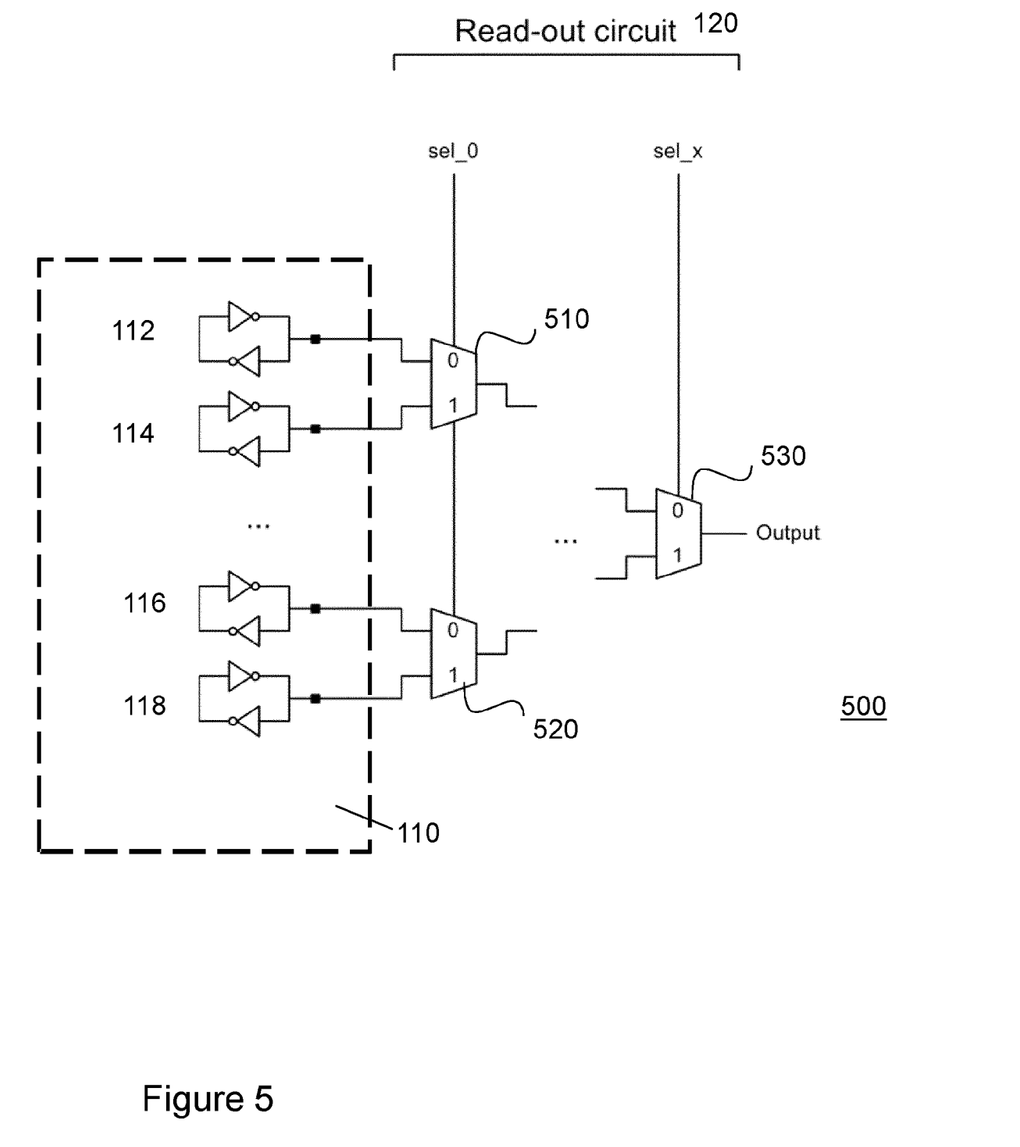
FIG. 5 is a block diagram illustrating a reading circuit for use in a PUF system.

FIG. 5 shows a PUF data source including plurality of bus-keepers 110 and a reading circuit in more detail. FIG. 5 shows 4 bus-keepers 112, 114, 116 and 118. Reading circuit 120 comprises a so-called MUX-tree through which the plurality of bus-keepers may be read out. Of the MUX tree, three MUXes are shown MUX 510, MUX 520 and MUX 530.

In general, one way of organizing the read-out of plurality of bus-keepers 110, is to have PUF control logic 130 send a bus-keeper selection signal to reading circuit 120; reading circuit 120 being configured to select a bus keeper from plurality of bus-keepers 110 associated with the bus-keeper selection signal and to read out the selected bus-keeper.

An embodiment of reading circuit 120 comprises a plurality of MUX-elements. In an embodiment, each bus-keeper of the plurality of bus-keepers is connected to a MUX-element of the plurality of MUX-elements. In an embodiment, each different bus-keeper of the plurality of bus-keepers is connected to a different MUX the plurality of MUX-elements. In an embodiment, at least two bus-keepers of the plurality of bus-keepers are connected to the same MUX of the plurality of MUXes.

In FIG. 5, the bus-keeper selection signal comprises a plurality of signals. A MUX in the MUX-tree is configured for receiving one signal of the plurality of selection signals and in selects in response one of its inputs. For example a MUX will select one input if it receives a logic 1 and select the other input if it receives a logic 0.

In FIG. 5 the MUX-tree is organized in a number of layers (also called levels); Each MUX in a same layer receiving the same signal of the plurality of signals. Each MUX in layer 0 is connected to two different bus-keepers, each one of the bus-keepers in plurality of bus-keepers 110 being connected to a MUX in layer 0. Each MUX in layer 0 receives signal sel_0. Each MUX in a subsequent layer, i.e., layers 1 to x, are connected with MUXes in previous layers. Together the MUX-tree, i.e., the reading circuit allows individual read-out of bus-keepers in plurality of bus-keepers 110.

The number of MUXes depends on the number of bus-keepers. When n bus-keepers are used, a MUX-tree having n−1 MUXes is possible.

If the number of bus-keepers is a power of 2, and the number is more than 1, the MUXes can be arranged such that each MUX in layer 1 to x is only connected to MUXes in the previous layer closer to plurality of bus-keepers 110; moreover all bus-keepers are connected to a MUX in layer 0. If the number of MUXes is not a power of 2, it may be needed for some MUXes to be connected to more than one previous layer.

An advantage of using MUXes for selecting a bus-keeper instead of an address decoder, e.g. an address decoder as used in SRAM, is that plurality of bus-keepers 110 can be separated from the read-out circuit in a power domain. As a result the power domain is smaller. A smaller power-domain has the advantage that a smaller switch can be used. Having plurality of bus-keepers 110 in a power-domain delays the aging process.

PUF system 100, in particular, reading circuit 120 and plurality of bus-keepers 110 do not have writing means for writing to plurality of bus-keepers 110. This allows reading circuit 120 and plurality of bus-keepers 110 to be smaller and consume less power. Reading circuit 120 is configured to read-out plurality of bus-keepers 110 in the absence of writing means for selectively writing data to plurality of bus-keepers 110.

Figure 6:
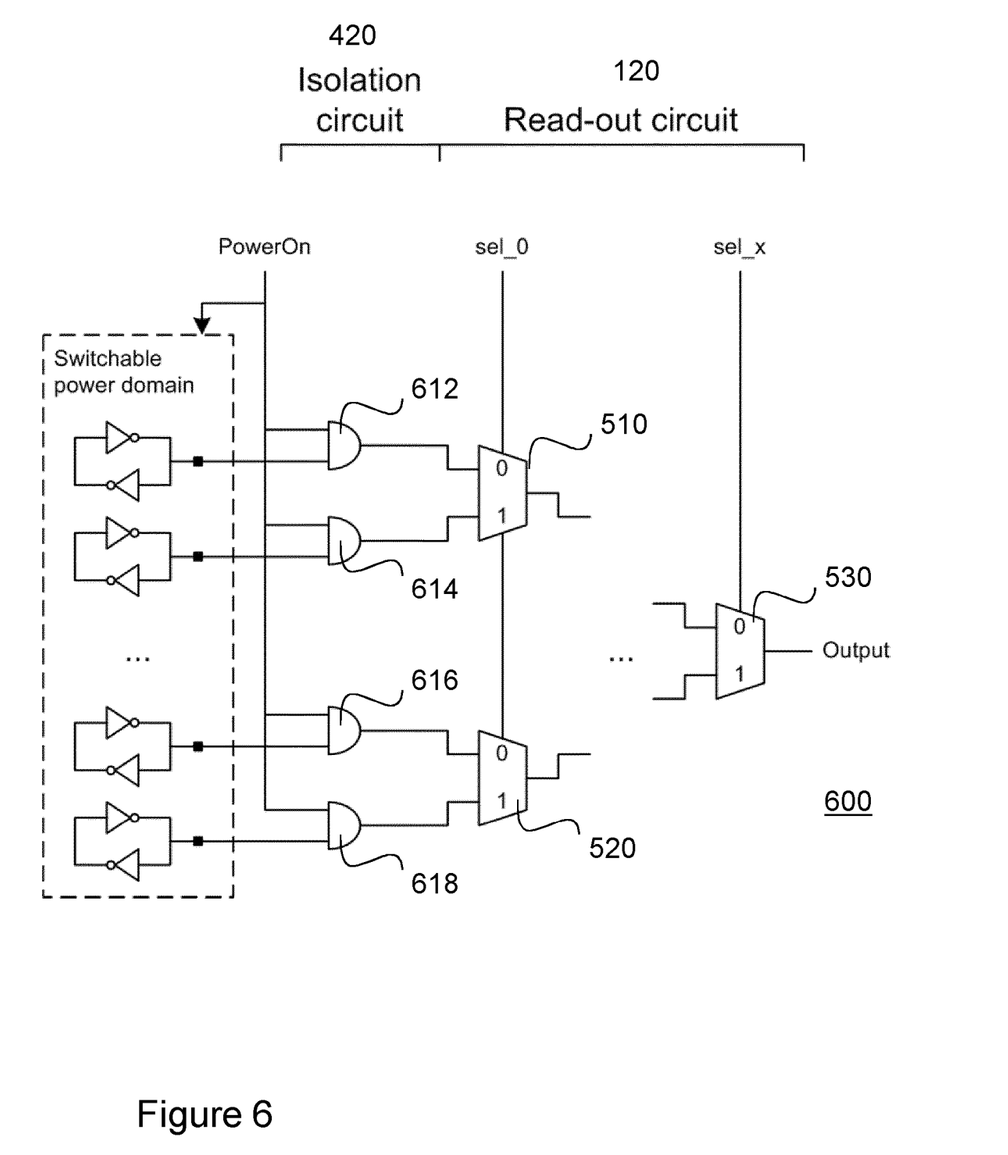
FIG. 6 is a block diagram illustrating a power domain for use in a PUF system.

FIG. 6 shows an embodiment wherein plurality of bus-keepers 110 is in a power domain.

FIG. 6 is the same as FIG. 5 except for the addition of a switchable power-domain and an isolation circuit.

Plurality of bus-keepers 110 is comprised in a switchable power domain for selectively connecting or disconnecting plurality of bus-keepers 110 to a power supply. The connecting may be on demand. For example, the switching may be initiated by reading circuit 120, e.g. connecting to a power supply before a read-out of a bus-keeper. Reading circuit 120 may disconnect plurality of bus-keepers 110 from the power supply after the read-out is complete. For example, the switching may be initiated by PUF control logic 130.

FIG. 6 comprises an isolation circuit 420 for isolating the power domain, i.e., plurality of bus-keepers 110, from the rest of the circuit when plurality of bus-keepers 110 is not connected to a power supply. In this embodiment isolation circuit 420 comprises a plurality of and-gates, here arranged in a layer. The layer of and-gates is arranged between plurality of bus-keepers 110 and layer 0 of the read-out circuit. Shown are and-gates 612, 614, 616 and 618 in isolation circuit 420. In this embodiment the number of and-gates is equal to the number of bus-keepers in plurality of bus-keepers 110. Each one of the and-gates in the plurality of and-gates has two inputs; one input being connected to a power control signal, the other being connected to a bus-keeper of plurality of bus-keepers 110.

During operation, when the power domain is switched-on, an and-gate will allow signals of plurality of bus-keepers 110 to pass through. However, when the power domain is switched-off, the and-gate effectively blocks plurality of bus-keepers 110 from reading circuit 120.

Figure 7:
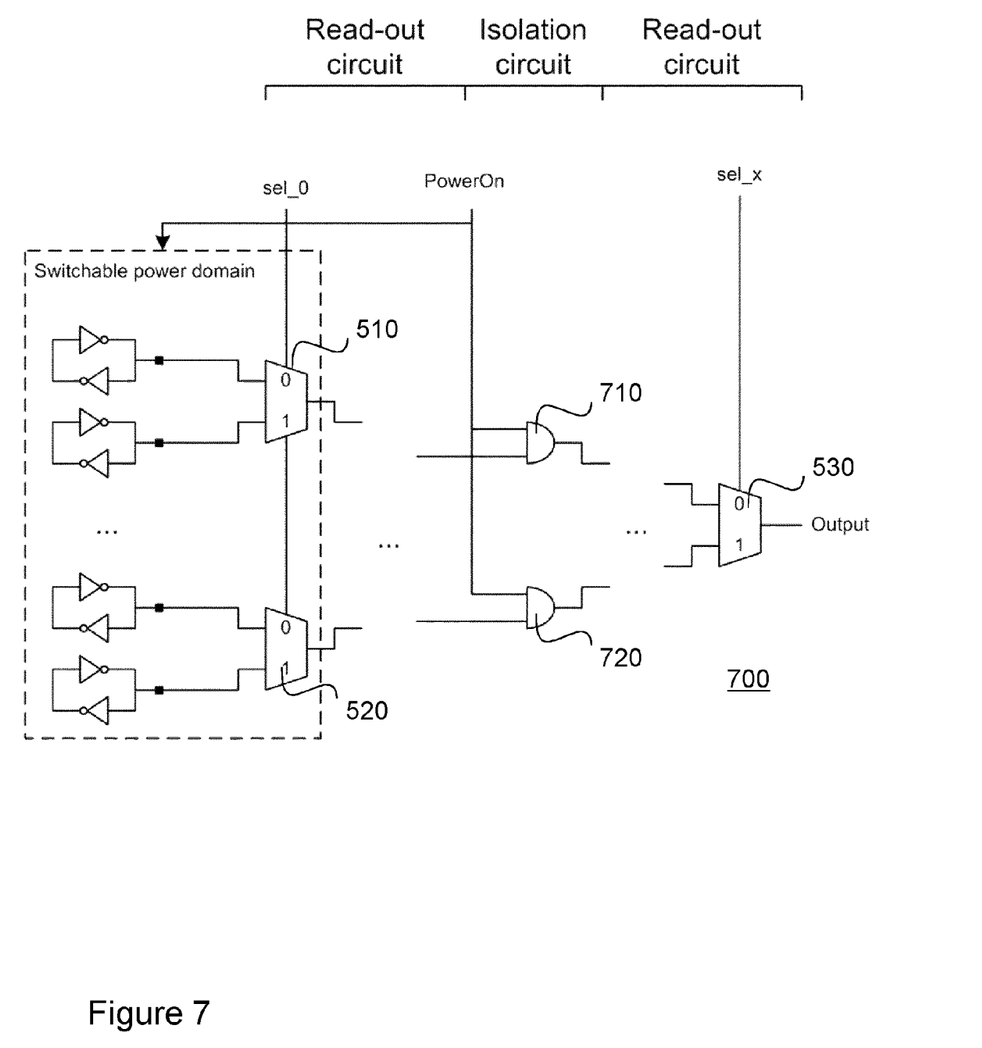
FIG. 7 is a block diagram illustrating a power domain for use in a PUF system.

FIG. 7 shows a different way in which an isolation circuit can be combined with reading circuit 120. Layer 0 of reading circuit 120 (as shown in FIG. 5) is included in the power domain. That is the MUXes 510 and 520 may also be selectively disconnected from the power-supply. An isolation circuit is arranged between an output side of the power-domain and an input side of a part of reading circuit 120 outside the power domain. In FIG. 7, the isolation circuit is arranged between two layers of reading circuit 120; for example, between layers 0 and 1. An advantage is that the isolations circuit is smaller, e.g., needs fewer and-gates.

The isolation cells, e.g. the AND gates, are additional gates, and only included to prevent floating signals going into the part of the circuit that remains powered. The floating signals can occur when the switchable power domain is switched off. Because these are additional cells that are not needed for the functionality (only to suppress physical effects), it is desirable to keep their number as low as possible.

By including some levels of MUXes in the switchable power domain the number of signals that crosses the power domain is reduced (factor two for every MUX level) and with that also the number of isolation cells. This reduces overall chip area. Depending on the number of bus-keepers and the total size of the chip this can be significant.

On the other hand, by keeping reading circuit 120 completely separate from the power domain, the power domain is smaller and correspondingly the power switches may be smaller, because during readout of the PUF data fewer signals will be toggling which thus reduces power consumption. Which way to make the trade-off, e.g. trade-off between power switch size and size of isolation cells, depends on the constraints of the design. A power switch may be a transistor, e.g., a FET transistor suitable for the size of the power domain.

Figure 8:
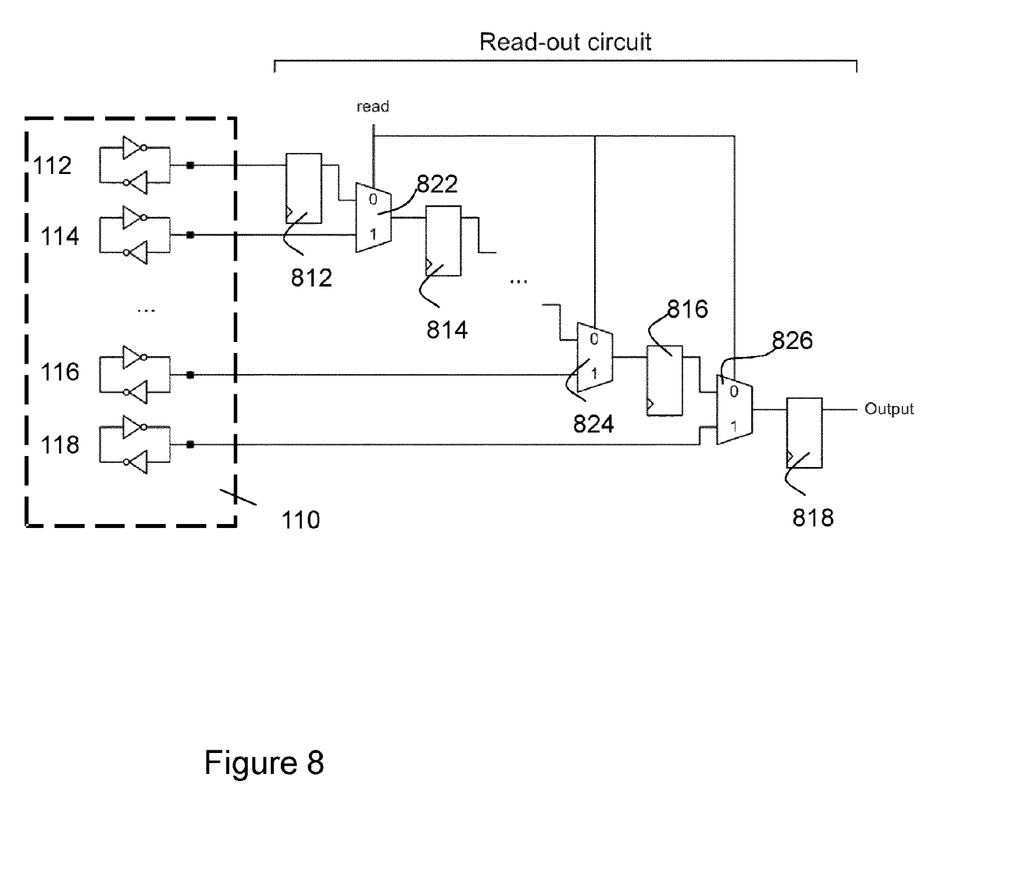
FIG. 8 is a block diagram illustrating a reading circuit for use in a PUF system.

FIG. 8 shows yet a different way of reading out plurality of bus-keepers 110 by reading circuit 120. FIG. 8 shows an implementation of reading circuit 120 with a shift register as read-out circuit. Here reading circuit 120 comprises a plurality of MUXes and flip-flops.

The readout circuit with shift registers does not need address decoding. It is built with flip-flops that are connected in series with MUXes. On power up the bus-keepers stabilize to their PUF data values.

After that the read signal is made 1 and a clock is given on the registers. This copies the PUF data into the flip-flops. After that the read signal is made 0 and on every next clock the data is shifted one bit at a time through the flip-flops to the output.

Yet other read-out circuits are possible. Multiple read-out circuits can be created in parallel to obtain a bus as output instead of a single bit. For example, a reading circuit without multiplexers may be obtained from FIG. 9 as follows.

Replace in FIG. 9, registers A and B by two bus-keepers files. For example, each register may comprise 32 bus-keepers. The bus-keepers can be selectively read out through the tristate buffers and the parallel 32-bit wide bus. Note that this embodiment does not comprise write logic for writing to the bus-keeper.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A physical unclonable function comprising
a plurality of cross-coupled loops of two invertors, each cross-coupled loop of the plurality of cross-coupled loops being configured to settle into one of at least two different stable states upon power-up, the particular stable state into which a particular cross-coupled loop of the plurality of cross-coupled loops settles being dependent at least in part upon at least partially random physical characteristics of the particular cross-coupled loop,
a reading circuit for reading the plurality of stable states into which the plurality of cross-coupled loops settled after a power-up, the physical unclonable function being configured for the plurality of cross-coupled loops to be read-only, and
a switchable power domain, the plurality of cross-coupled loops being comprised in the power domain and at least a part of the physical unclonable function being outside the power domain, the power domain being configured for selectively connecting and disconnecting the plurality of cross-coupled loops from a power supply while the at least a part of the physical unclonable function is connected to the power supply.

2. A physical unclonable function as in claim 1, wherein the plurality of cross-coupled loops of two invertors are a plurality of bus-keepers.

3. A physical unclonable function as in claim 1, wherein at least part of the reading circuit is outside the power domain.

4. A physical unclonable function as claim 1, wherein the power domain is only powered during read out of the cross-coupled loops.

5. A physical unclonable function as in claim 1, wherein the plurality of cross-coupled loops, the power domain, and the at least a part of the physical unclonable function are implemented on a single integrated circuit.

6. A physical unclonable function as in claim 1, comprising an isolation circuit for isolating the plurality of cross-coupled loops from the at least a part of the physical unclonable function while the plurality of cross-coupled loops is disconnected from the power supply.

7. A physical uncloable function as in claim 6, wherein the isolation circuit comprises a plurality of and-gates.

8. A physical unclonable function as in claim 1, wherein at least one cross-coupled loop comprises exactly one data connection, and wherein the exactly one data connection is only configured for reading the stable-state into which the at least one cross-coupled loop settled upon power-up.

9. A physical unclonable function as in claim 1 wherein the reading circuit comprises a plurality of multiplexers for selecting cross-coupled loops from the plurality of cross-coupled loops.

10. A physical unclonable function as in claim 9, wherein each cross-coupled loop of the plurality of cross-coupled loops is connected to a multiplexer of the plurality of multiplexers.

11. A physical unclonable function as in claim 9, wherein at least two cross-coupled loops of the plurality of cross-coupled loops are connected to the same multiplexer of the plurality of multiplexers.

12. A physical unclonable function as in claim 9, wherein the plurality of multiplexers is arranged as a multiplexer-tree, the reading circuit being arranged for reading the plurality of stable states through the multiplexer-tree.

13. A physical unclonable function as in claim 9, wherein each different cross-coupled loop of the plurality of cross-coupled loops is connected to a different multiplexer of the plurality of multiplexers.

14. A physical unclonable function as in claim 1, comprising PUF control logic for deriving an identifier from the plurality of stable states.

15. A physical unclonable function as in claim 14, wherein the PUF control logic is configured for applying an error correcting algorithm to the plurality of stable states and to helper data for deriving the identifier.

16. A physical unclonable function as in claim 14, wherein the PUF control logic is configured for deriving a random number from the plurality of stable states.

17. A physical unclonable function as in claim 14, wherein the PUF control logic is configured for a read-cycle comprising:
powering down the plurality of cross-coupled loops,
powering up the plurality of cross-coupled loops, and
reading the plurality of cross-coupled loops.

18. A method for obtaining PUF data comprising
powering-up a plurality of cross-coupled loops comprised in a switchable power domain configured for selectively connecting and disconnecting the plurality of cross-coupled loops from a power supply,
allowing each one of the plurality of cross-coupled loops to settle into one of at least two different stable states, the particular stable state into which a particular cross-coupled loop of the plurality of cross-coupled loops settles being dependent at least in part upon at least partially random physical characteristics of the particular cross-coupled loop,
reading the plurality of stable states into which the plurality of cross-coupled loops settled after a power-up through a reading circuit, the plurality of cross-coupled loops being read-only.

19. A non-transitory tangible computer readable storage medium comprising computer program code adapted to perform, when the computer program is run on a computer; powering-up a plurality of cross-coupled loops comprised in a switchable power domain configured for selectively connecting and disconnecting the plurality of cross-coupled loops from a power supply,
allowing each one of the plurality of cross-coupled loops to settle into one of at least two different stable states, the particular stable state into which a particular cross-coupled loop of the plurality of cross-coupled loops settles being dependent at least in part upon at least partially random physical characteristics of the particular cross-coupled loop,
reading the plurality of stable states into which the plurality of cross-coupled loops settled after a power-up through a reading circuit, the plurality of cross-coupled loops being read-only.

* * * * *